US 7,702,562 B1

(12) United States Patent
Tenorio

(10) Patent No.: US 7,702,562 B1
(45) Date of Patent: Apr. 20, 2010

(54) PROVIDING VISUALIZATION OF MARKET OFFERS USING PATTERNS OF GEOMETRIC DISPLAY ELEMENTS

(75) Inventor: Noel Tenorio, Mountain View, CA (US)

(73) Assignee: i2 Technologies US, Inc., Dallas, TX (US)

( * ) Notice: Subject to any disclaimer, the term of this patent is extended or adjusted under 35 U.S.C. 154(b) by 1540 days.

(21) Appl. No.: 09/970,371

(22) Filed: Oct. 2, 2001

(51) Int. Cl.
*G06Q 40/00* (2006.01)
(52) U.S. Cl. ...................................................... 705/37
(58) Field of Classification Search .................. 705/26, 705/37
See application file for complete search history.

(56) References Cited

U.S. PATENT DOCUMENTS

| | | | |
|---|---|---|---|
| 6,993,504 B1 | 1/2006 | Friesen et al. | |
| 7,020,630 B2 * | 3/2006 | Russell et al. | 705/36 R |
| 7,212,999 B2 * | 5/2007 | Friesen et al. | 705/37 |
| 2002/0007324 A1 * | 1/2002 | Centner et al. | 705/26 |
| 2002/0032637 A1 * | 3/2002 | Moshal et al. | 705/37 |
| 2002/0065762 A1 * | 5/2002 | Lee et al. | 705/37 |
| 2002/0091590 A1 * | 7/2002 | Edgar et al. | 705/28 |
| 2002/0165813 A1 * | 11/2002 | Lee | 705/37 |
| 2002/0165814 A1 * | 11/2002 | Lee et al. | 705/37 |
| 2002/0178105 A1 * | 11/2002 | Levine | 705/37 |
| 2002/0194104 A1 * | 12/2002 | Reamer et al. | 705/37 |
| 2003/0004853 A1 * | 1/2003 | Ram et al. | 705/37 |
| 2003/0009411 A1 * | 1/2003 | Ram et al. | 705/37 |
| 2003/0097325 A1 * | 5/2003 | Friesen et al. | 705/37 |

OTHER PUBLICATIONS

"Mastering Excel 4 For Windows," by Carl Townsend. Copyright 1992 by Sybex. Chapter 20, pp. 423-454 (35 pages).*
Pearson Education. Copyright 2001 by Addison-Wesley. p. 11. (2 pages).*
Free On-line Dictionary of Computing. Copyright 1993-2007 Denis Howe. (1 page).*
"Microsoft Press Computer Dictionary Third Edition," editor: Kim Fryer. Copyright 1997 by Microsoft Corporation. p. 488 (3pages).*
@The Moment: The Platform for Real-Time Trading; "How Quickly Can You Respond to Your Markets?" pp. 1, 2001.
@The Moment Solutions; "Dynamic Trading for a Dynamic World" pp. 1, 2001.
Trade@The Moment: The Platform for Real-Time Trading; pp. 1-2, 2001.

(Continued)

*Primary Examiner*—Jagdish N Patel
*Assistant Examiner*—Sara Chandler
(74) *Attorney, Agent, or Firm*—Booth Udall, PLC; Steven J. Laureanti

(57) ABSTRACT

A method of providing visualization of market offers includes receiving offer data for multiple offers, the offer data reflecting values specified in the offers for multiple offer variables. The method further includes generating a display of the offer data. The display includes multiple patterns, each pattern representing a particular offer and including multiple bars. Each bar within the pattern represents a particular offer variable and includes a set of one or more geometric display elements that by virtue of their appearance collectively encode, according to a predefined encoding scheme, a value for the offer variable corresponding to the bar.

24 Claims, 2 Drawing Sheets

OTHER PUBLICATIONS

@The Moment Real-Time Trading Applications; pp. 1-2, 2001.
@The Moment Professional Services; pp. 1, 2001.
@The Moment Trade @The Moment FAQ; "Frequently Asked Questions (FAQ) About Dynamic Trading" pp. 1-9, 2001.
Trade@The Moment Demos; pp. 1, 2001.
@The Moment Screen Shots; pp. 1-3, 2001.
Market Operator Navigation; pp. 1, 2001.
Market Type Selection Page; pp. 1-2, 2001.
Market Access Control Selection Page; pp. 1-2, 2001.
Market Report; "marketplace@themoment;" pp. 1, 2001.
Bid/Ask Pricing Page, pp. 1-4, 2001.
Bid/Ask Page/Pitometer; pp. 1-4, 2001.
Bid/Ask Page/Order Book; pp. 1-4, 2001.
@TheMoment Technology; pp. 1-2, 2001.
@TheMoment Papers; pp. 1, 2001.
@TheMoment Reliant Energy Customer Story, "Reliant Energy Turns to @TheMoment to Provide First ERCOT Auction for Electricity Generation Capacity;" pp. 1-2.
@TheMoment White Paper Series; "Leveraging Web-Based Dynamic Trading for Gas Pipeline Capacity Sales;" pp. 1-8, Jul. 2001.
@TheMoment White Paper Series; "Building Competitive Advantage in Turbulent Markets Through Web-Based Dynamic Trading Technologies;" pp. 1-12, Aug. 2001.
@TheMoment White Paper Series; "Reducing Inventory Risks in High-Tech Component Manufacturing with Forward Contracts;" pp. 1-12, Aug. 2001.
@TheMoment White Paper Series; "The Role off Web-Based Dynamic Trading in Restructured Electric and Gas Markets;" pp. 1-14, Oct. 2001.
Trade@TheMoment: LDC Data Sheet; "The Complete Trading Solution for LDCs;" pp. 1-4, Oct. 2001.
Trade@TheMoment:Power Data Sheet; "The Complete Trading Solution for Electric Utilities;" pp. 1-2, Nov. 2001.

* cited by examiner

PROVIDING VISUALIZATION OF MARKET OFFERS USING PATTERNS OF GEOMETRIC DISPLAY ELEMENTS

TECHNICAL FIELD OF THE INVENTION

This invention relates generally to electronic commerce and in particular to providing visualization of market offers using patterns of geometric display elements.

BACKGROUND OF THE INVENTION

Business transactions are increasingly taking place over the Internet and other electronic communication networks. Electronic markets may provide a forum for such transactions, allowing buyers to locate sellers, and vice versa. This process may involve a buyer (or seller) identifying one or more suitable offers to sell (or buy) from one or more sellers (or buyers). However, it may be difficult for a buyer (or seller) to identify suitable offers to sell (or buy) from among the offers available to the buyer (or seller) for a number of reasons. For example, there may be a relatively large amount of information for a buyer (or seller) to consider when trying to identify suitable offers to sell. The market may include a relatively large number of offers.

Offers may include a number of variables, and there may be a relatively large number of possible values for each variable. Additionally, there may be no available offers providing a substantial match with a particular order from the buyer (or seller). The buyer (or seller) may therefore have to determine which of the available offers provide a relatively close match with that order, taking into account a number of offer variables and possibly the relative priorities of such variables.

SUMMARY OF THE INVENTION

According to the present invention, disadvantages and problems associated with previous techniques for displaying market data may be substantially reduced or eliminated.

According to one embodiment of the present invention, a method of providing visualization of market offers includes receiving offer data for multiple offers, the offer data reflecting values specified in the offers for multiple offer variables. The method further includes generating a display of the offer data. The display includes multiple patterns, each pattern representing a particular offer and including multiple bars. Each bar within the pattern represents a particular offer variable and includes a set of one or more geometric display elements that by virtue of their appearance collectively encode, according to a predefined encoding scheme, a value for the offer variable corresponding to the bar.

Particular embodiments of the present invention may provide one or more technical advantages. For example, certain embodiments may provide visualization of multiple offers each including multiple offer variables using patterns of geometric display elements. Use of such patterns may allow a user to more readily identify suitable offers from among multiple existing offers in an electronic market, through comparison with a reference pattern representing the needs of the user as specified in a user query or other user request. This may be especially true where there are a relatively large number of offers and a relatively large number of possible values for each variable, such that distinguishing between these offers would be very difficult using previous techniques. Thus, the present invention may allow a user to more easily determine which of the available offers provide a relatively close match with the query or other request. Certain embodiments may allow a user to more readily take into account a number of offer variables and possibly the relative priorities of such variables when making such a determination. Particular embodiments may incorporate one or more approved seller (or buyer) lists into a visualization of offers, which may allow a user to more easily identify suitable offers from among a number of offers in an electronic market considering such lists. Certain embodiments may highlight for a user one or more costs associated with excluding one or more sellers (or buyers), such as a resulting price increase (or decrease). The present invention may help to increase the efficiency and effectiveness with which a user interacts with a computer system that supports an electronic market and improve the ability of the user to make informed and successful market decisions.

Systems and methods incorporating one or more of these or other technical advantages may be well suited for modern electronic markets. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF EXAMPLE EMBODIMENTS

Figure 1:
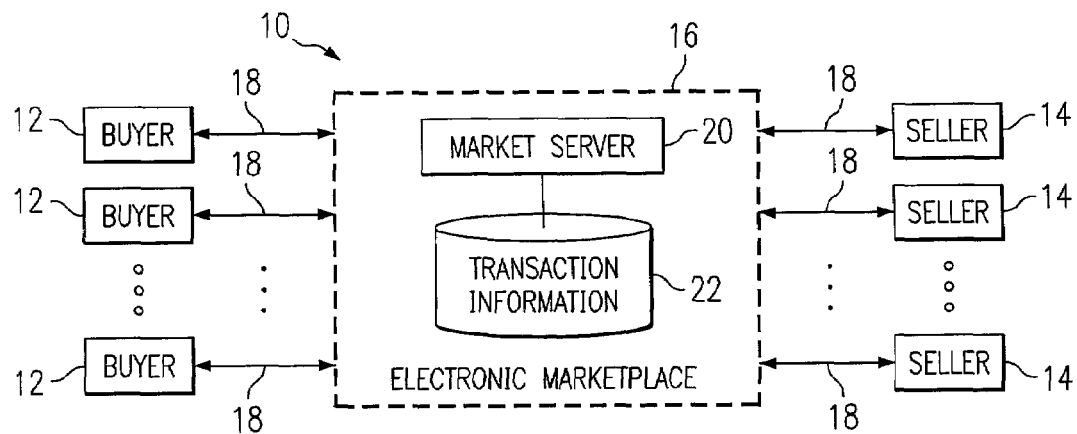
FIG. 1 illustrates an example system for providing visualization of market offers using patterns of geometric display elements.

FIG. 1 illustrates an example system 10 for providing visualization of market offers using patterns of geometric display elements. System 10 may include one or more buyers 12, one or more sellers 14, and at least one electronic marketplace 16 associated with a web site or other environment accessible to buyers 12 and sellers 14. In general, electronic marketplace 16 may receive bids from buyers 12 and asks from sellers 14, match bids and asks where appropriate, and initiate transactions between buyers 12 and sellers 14 where appropriate. Electronic marketplace 16 may receive a query in connection with the discovery phase of an electronic commerce transaction and may thereafter search one or more databases to return search results responsive to these query. A bid may be matched with an ask, for example, where the corresponding bid price is greater than or substantially equal to the corresponding ask price, and matching a bid with an ask may result in a transaction being initiated between the correspond buyer 12 and seller 14. A bid may include an offer to buy, and an ask may include an offer to sell. Such offers may include a number of variables, and each offer may specify a value for one or more of these variables. For example, a bid may specify a bid price, a bid quantity, a delivery time, and values for any other suitable variables. The present invention contemplates any suitable offers with any suitable variables. Reference to an "offer" may include a bid, an ask, or either, where appropriate.

Although certain example markets are described herein, the present invention contemplates any suitable market including one or more offers from one or more buyers 12 and one or more sellers 14. For example, the present invention may provide visualization of a number of offers in an auction-based market, an exchange-based market, a Request for Comment (RFQ)-based market, or any other suitable market. Additionally, the present invention may provide visualization of a number of offers in a market that is part of a larger market including a number of associated markets. Although buyers 12 and sellers 14 are described as separate entities, a buyer 12 in one transaction may be a seller 14 in another transaction, and vice versa. Moreover, reference to a "buyer" or a "seller" may include a person, a computer system having one or more computers, an enterprise, or any other buying or selling entity, as appropriate. For example, a buyer 12 may include a computer programmed to autonomously identify a need for an item, search for that item, and buy that item upon identifying a suitable seller. Although buying and selling are described herein, the present invention contemplates any appropriate market transaction. Items may include raw materials, component parts, products, or any other tangible or intangible things that may be the subject of a transaction between a buyer 12 and a seller 14, and a single item may include one or more other items. Additionally, items may include lots, blocks, bundles, bushels, or other suitable units of one or more individual items, where appropriate. For example, capacitors may be bought and sold in indivisible units of five hundred capacitors, instead of one capacitor at a time.

Buyers 12, sellers 14, and electronic marketplace 16 may be coupled to each other using links 18 that may each include one or more local area networks (LANs), metropolitan area networks (MANs), wide area networks (WANs), a portion of the Internet, or any other appropriate wireline, optical, wireless, or other links. The components of electronic marketplace 16 may operate on one or more computers at one or more locations, and electronic marketplace 16 may share one or more computers or other resources with one or more buyers 12 or one or more sellers 14, according to particular needs. Bids and asks may be received by the electronic marketplace 16 or an associated device in any suitable format, such as in the form of Hypertext Markup Language (HTML), Extensible Markup Language (XML), or other suitable files within Hypertext Transport Protocol (HTTP) messages.

Associated with electronic marketplace 16 may be one or more market servers 20 and one or more databases containing transaction information 22. In general, market server 20 may support a particular electronic market for a particular item. For example, market server 20 may receive bids from buyers 12 and asks from sellers 14, prioritize bids and asks, match bids with asks where appropriate, initiate transactions between buyers 12 and sellers 14 where appropriate, cancel or otherwise remove from the market a bid or ask (automatically or at the request of the corresponding buyer 12 or seller 14), keep a record of initiated transactions by storing associated transaction information 22, and perform other appropriate tasks associated with supporting an electronic market. In addition, market server 20 may perform tasks associated with generating a display providing visualization of a number of offers including a number of offer variables. For example, market server 20 may communicate data reflecting offers in the market to one or more buyers 12, sellers 14, or other suitable entities, which data may be used by the recipients to generate displays providing visualization of the offers. Transaction information 22 may include a number of records, each corresponding to a particular initiated transaction. A record of an initiated transaction may reflect one or more transaction terms, which may be the terms of the accepted offer. Such terms may include a transaction price, a transaction quantity, and other suitable transaction teens. Transaction information 22 may be used by buyer 12, seller 14, and any other appropriate entities to finalize a transaction between buyer 12 and seller 14 initiated as the result of a strike or for any other suitable purposes.

Figure 2:
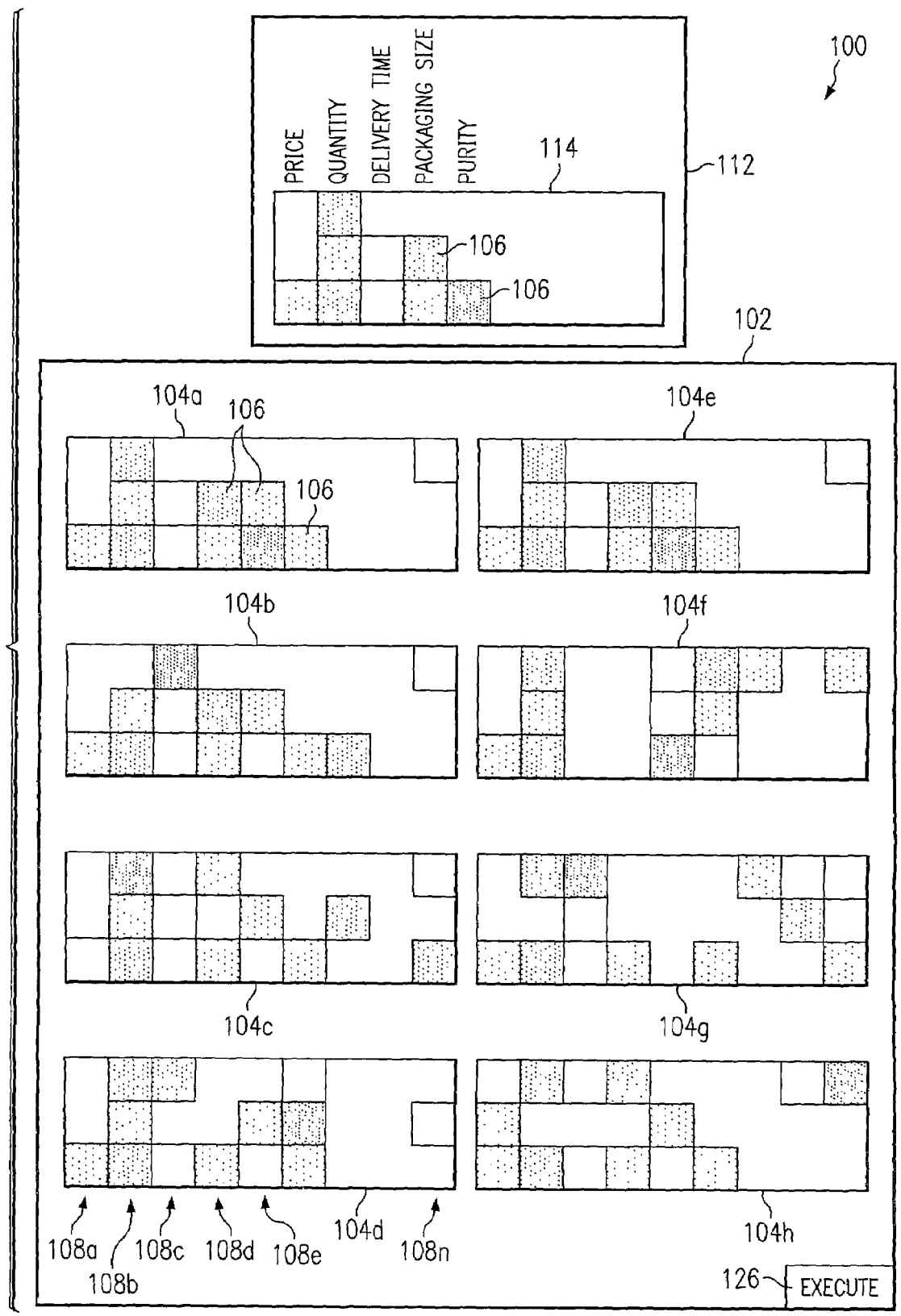
FIG. 2 illustrates an example display that includes patterns of geometric display elements to provide visualization of market offers.

FIG. 2 illustrates an example display 100 including patterns of geometric display elements to provide visualization of associated market offers. Display 100 may be generated in any suitable manner for use by any suitable entities. In one embodiment, for example, market server 20 may communicate data reflecting values specified in a number of offers to a computer system associated with a buyer 12, which computer system may, using the communicated data, generate display 100 for the exclusive use of buyer 12. In another embodiment, for example, market server 20 may locally generate all or certain portions of display 100 for a buyer 12 and communicate corresponding display data to a computer system associated with buyer 12 for the exclusive use of buyer 12. In another embodiment, for example, market server 20 may locally generate certain portions of display 100 for use by any number of buyers 12 and communicate corresponding display data to a computer system associated with a particular buyer 12, which computer system may modify display 100 (which may include generating further portions of display 100) for buyer 12. Although display 100 is described as being generated for and used by a buyer 12, the present invention contemplates display 100 being generated for any suitable entity for any suitable purpose. Display 100 may be updated as changes in offers occur (which may include new offers being made, existing offers being modified, offers being removed from the market, and possibly other changes) to provide a substantially real-time visualization of offers in the market. Display 100 may provide visualization of any suitable offers in any suitable market. For example, display 100 may provide visualization of bids, asks, or both in an exchange-based market.

Display 100 may include offers display 102 including patterns 104 of display elements 106, which may include squares or any other suitable geometric shapes.

Each pattern 104 represents a particular offer and encodes the values of one or more offer variables for the particular offer using elements 106. In one embodiment, as indicated with reference to pattern 104*d*, each column 108 of elements 106 represents the value of a particular offer variable for the offer of the corresponding pattern 104. The value of an offer variable may be represented using in any suitable manner using one or more elements 106 in an associated column 108 of pattern 104. For example, in a particular embodiment, each column 108 includes three elements 106 and encodes the value for the corresponding offer variable using a scheme of colors, color properties, shading, or other indicia by which each element 106 is given a certain indicia based on the value of the offer variable. As just an example, and not by way of limitation, a purity variable may have possible integer values ranging from one to 10, each value may be assigned a sequence of three colors (e.g., aqua, orange, and gold), and that sequence may be visually displayed using three elements 106 in column 108 corresponding to the purity variable. Values for any suitable number of offer variables may be represented in this manner using elements 106.

Although the number of elements 106 in each column 108 is illustrated as being the same for all columns 108, and although this may be preferable for visual continuity and ease of interpretation, the number of elements 106 in columns 108 may vary according to particular needs. In addition, display 100 may have any suitable orientation. For example, rather than elements 106 being organized within vertical columns 108 (as shown), elements 106 may be organized within horizontal rows or in any other suitable manner, according to particular needs. Thus, where appropriate, columns 108 may be referred to as "bars" to encompass all such orientations. The scheme by which the indicia are assigned to elements 106 is preferably selected such that the user is able to readily visually distinguish the set of elements 106 in a column 108 in a pattern 104 for a first offer from the set of elements 106 in the same column 108 in the pattern 104 for a second offer where the values for the corresponding offer variable are sufficiently different between the first offer and the second offer. Analogously, the scheme is preferably selected such that the user may readily visually associate the set of elements 106 in a column 108 in a pattern 104 for a first offer with the set of elements 106 in the same column 108 in the pattern 104 for a second offer where the values for the corresponding offer variable are sufficiently similar between the first offer and the second offer. By comparing patterns 104 for offers, the user is preferably able to readily identify which offers are comparable and which offers are not, without needing to conduct a detailed comparison of the actual values associated with the offers as in previous techniques. This may be especially useful where display 100 includes a large number of patterns 104 for a large number of offers. In addition, possibly in combination with text, a visually distinguishing aspect of a pattern 104 may identify the market participant that has made the offer represented by pattern 104.

As an example of at least some of the concepts described above and not by way of limitation, asks from all sellers 14 participating in an exchange-based market may be represented within display 100. The asks may include an ask price variable (which may include a per-item ask price), an ask quantity variable, a delivery date variable, a packaging size variable, and a purity variable, and each ask may specify a value for each of these variables. Each pattern 104 in display 100 may thus include an ask price column 108a, an ask quantity column 108b, a delivery date column 108c, a packaging size column 108d, and a purity bar column 108e. Per-item ask prices specified in the asks may generally vary between $5.00 and $10.00, ask quantities specified in the asks may generally vary between one hundred and six hundred items, delivery dates specified in the asks may generally vary between one day and six days from transaction closing, packaging sizes specified in the asks may generally vary between ten and sixty items per package, and purity levels specified in the asks may generally vary between a purity level of five and a purity level of ten (which purity levels may correspond to a purity scale including a lower limit of zero and an upper limit of ten). To accommodate these ranges of values, elements 106 in column 108a may represent any value or range of values in a range of $5.00 to $10.00, elements 106 in column 108b may represent any value or range of values in a range of one hundred items to six hundred items, elements 106 in column 108c may represent any value or range of values in a range of one day to six days from transaction closing, elements 106 in column 108d may represent any value or range of values in a range of ten items per package to sixty items per package, and elements 106 in column 108e may represent any value or range of values in a range of five to ten. Although an example market with offers specifying values for example offer variables represented using columns 108 of elements 106 is described and illustrated, the present invention contemplates any suitable market with any suitable offers, offer variables (and their associated columns 108), and values (and their associated elements 106). Columns 108 may be arranged in any appropriate order and, preferably, may be rearranged in response to user input specifying such rearrangement.

One or more approved market participant lists may be incorporated into display 100 automatically or at the request of a user. An approved market participant list may include an approved vendor list (AVL) for a buyer 12 or an approved buyer list for a seller 14, as appropriate. Market participants may be excluded from an approve market participant list for any suitable reason. For example, a buyer 12 may exclude from an AVL all sellers 14 not within a certain geographical area. Approved market participant lists for a particular entity may vary from item to item. For example, an AVL for a first item for a buyer 12 may include a particular seller 14, while an AVL for a second item for that buyer 12 may exclude that seller 14. An approved market participant list may be incorporated into display 100 in any suitable manner. For example, any patterns 104 representing offers from excluded market participants may be excluded from display 100 or, alternatively, included within display 100 but made visually distinguishable from patterns 104 representing offers from approved market participants. Including patterns 104 representing offers from excluded market participants within display 100 may highlight for a user effects of excluding one or more market participants, which effects may include there being fewer options available to a buyer 12 or seller 14 seeking to identify one or more suitable offers and thus higher or lower prices, respectively. An approved market participant list may be accessed in any suitable manner. For example, an approved market participant list may be stored in a database accessible to a computer system supporting display 100, which computer system may access the approved market participant list in generating display 100 to determine which market participants are approved and which are not.

In addition to offers display 102 containing patterns 104 representing offers, display 100 may include a request display 112 containing one or more patterns 114 representing one or more associated user queries or other user requests. A request may include values for one or more offer variables and may represent an ideal offer matching one or more preferences for a user. For example, a user may enter a value for one or more offer variables represented by columns 108 within patterns 104. The entered values may each match preferences for the user for the variables represented by columns 108, and a pattern 114 representing the entered request may be generated within display 112 allowing the user to compare the request represented by pattern 114 with offers represented by patterns 104 within offers display 102. Allowing the user to make such a comparison may allow the user to more easily identify one or more offers providing a "best fit" match with the request. For example, the user may determine that the offer represented by pattern 104e provides the best fit match with the request represented by pattern 114 among the available offers. Thus, the present invention may be particularly useful in connection with proximity, as opposed to exact match, searching.

Display 100 may also include execution icon 126, which may facilitate order entry. A user may select execution icon 38 to cause an order to be automatically generated based on information displayed within display 100 and communicated to market server 20. Any suitable combination of hardware and software supporting display 100 may operate to generate an order and communicate it to market server 20. Where an order communicated to market server 20 substantially matches an available offer, market server 20 may match the order with one or more appropriate offers upon receiving the order. Where an order communicated to market server 20 does not substantially match an available offer, market server 20 may hold the order until an offer substantially matching the order is received. Where the order can be considered an offer, that offer may, if not matched, be included within a display 100 accessible to other users, such as, for example, sellers 14 where the offer is submitted on behalf of a buyer 12.

Information for generating an order may be entered in any suitable manner. As described above, for example, a user may enter one or more values for variables represented by columns 108. A pattern 114 representing the entered request may be generated within display 112, which may allow the user to compare the request with one or more offers to identify one or more offers providing a best fit match with the request. The user may select execution icon 38 to cause an order to be generated based on the entered request and communicated to market server 20. Alternatively, the user may first modify one or more entered values such that the request on which the order is based sufficiently matches an offer represented by a pattern 104 in the display 102. In addition or as an alternative to manually entering values, a user may select a pattern 104 within display 102 and then select execution icon 126, which may cause an order to be generated with the values specified in the offer represented by the selected pattern 104 and communicated to market server 20 for execution.

Although display 100 is described and illustrated with reference to a market including a number of offers from sellers 14, the present invention contemplates any suitable information being represented within display 100. For example, a user may enter a parametric query for data for items matching one or more criteria. The query may be communicated to one or more databases containing data for a number of items, possibly from a number of different sellers 14. Data for items matching the criteria returned in response to the query may be represented within display 100, such that each pattern 104 represents values for attributes of a particular item. Such data for a particular item may constitute an offer from an associated seller 14.

Figure 3:
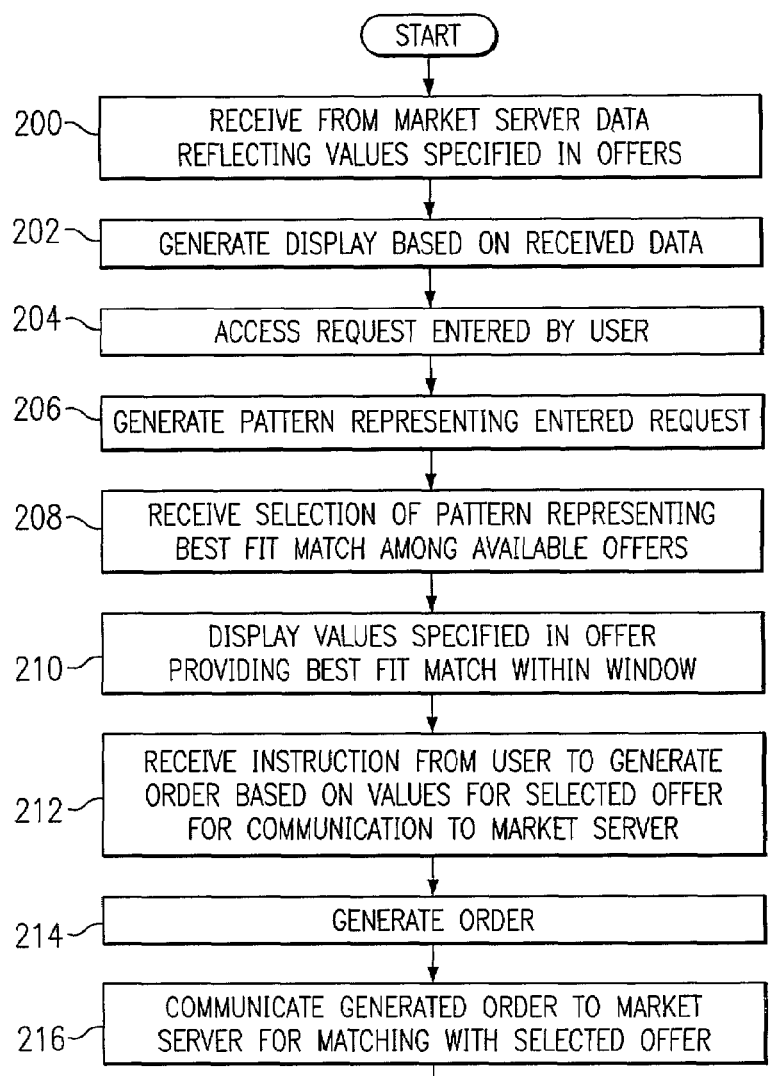
FIG. 3 illustrates an example method for providing visualization of market offers using patterns of geometric display elements.

FIG. 3 illustrates an example method of providing visualization of market offers using patterns of geometric display elements. The method begins at step 200, where a computer system associated with a buyer 12 receives data reflecting values specified in a number of offers in a market. As described above, the data may be received from a market server 20 supporting the market. Although display 100 is described as being generated for a buyer 12, the present invention contemplates display 100 being generated for any suitable entities (which may include buyers 12, sellers 14, or both) for any suitable purpose, as described above. Although display 100 is described as being locally generated using data received from a market server 20, display 100 may be generated in any suitable manner, as described above. At step 202, the computer system generates display 100 based on the received data. As described above, display 100 may include patterns 104 representing offers, each pattern 104 including columns 108 representing offer variables, each column 108 including one or more elements 106 encoding the value of the offer variable for the column 108. At step 204, the computer system accesses a query or other request entered by a user. The request may include a value for every offer variable that is represented within patterns 104. At step 206, the computer system generates a pattern 114 within display 100 representing the entered request. This may, as described above, allow the user to readily identify upon visual inspection a best fit match from among the available offers, particularly where the number of offers or offer variables is relatively large.

At step 208, the computer system receives from the user a selection of the pattern 104 representing the offer that provides the best fit match with the entered request from among the available offers. At step 210, the computer system may display the values specified in the offer providing the best fit match using a suitable window within display 100 (not shown), which may involve changing any values already displayed within the window to match the values of the offer providing the best fit match. At step 212, the computer system receives an instruction to generate an order based on the values for the selected offer for communication to market server 20. As described above, the user may provide an order the instruction by selecting execution icon 126. At step 214, the computer system generates an order based on values for the selected offer. As described above, the generated order may specify values being displayed within a window of display 100 (not shown). At step 216, the computer system communicates the generated order to market server 20 for matching with the selected offer, and the method ends.

Although the present invention has been described with several embodiments, a plethora of changes, substitutions, variations, alterations, and modifications may be suggested to one skilled in the art, and it is intended that the invention may encompass all such changes, substitutions, variations, alterations, and modifications fall within the spirit and scope of the appended claims.

What is claimed is:

1. A computer-implemented system for generating an order in an electronic marketplace, the system comprising:
   one or more databases coupled with a plurality of seller computer systems, the one or more databases storing transactional data;
   a server system coupled with the one or more databases, the server system configured to:
      receive from at least one of the plurality of seller computer systems one or more offers, and store the one or more offers as transactional data in the one or more databases, the one or more offers reflecting values specified for a plurality of seller offer variables;
   a buyer computer system coupled with the server system, the buyer computer system configured to:
      receive a buyer request, the buyer request comprising values for a plurality of buyer offer variables;
     access the one or more offers stored as transactional data in the one or more databases;
      generate a display comprising:
         a buyer request display comprising one or more patterns representing the buyer request, the one or more patterns of the buyer request comprising a plurality of bars, each bar representing a particular buyer offer variable and comprising a set of one or more geometric display elements, the particular one of the plurality of buyer offer variables encoded by the buyer computer system according to a predefined encoding scheme, wherein each geometric display element in the set of geometric display elements has a color according to the value being represented; and
         an offers display of the one or more offers, the offers display comprising a plurality of patterns, each pattern of the plurality of patterns representing a particular one of the one or more offers and comprising a plurality of bars, each bar representing a particular one of the plurality of seller offer variables and comprising a set of one or more geometric display elements, the particular one of the plurality of seller offer variables being encoded by the buyer computer system according to the predefined encoding scheme, wherein each geometric display element in the set of geometric display elements has a color according to the value being represented;

compare the one or more patterns of the buyer request display with the plurality of patterns of the offers display to determine a best fit match between at least one of the plurality of patterns representing the one or more offers and the one or more patterns representing the buyer request; and generate an order based on the best fit match and communicate the order to the server system.

2. The system of claim 1, wherein the predefined encoding scheme encodes a first value of a first offer variable in a first pattern associated with a first offer and encodes a second value of the first offer variable in a second pattern associated with a second offer.

3. The system of claim 1, wherein the sets of geometric display elements are encoded according to a predefined color scheme; and each geometric display element in a set of geometric display elements has a color according to the value being represented and the predefined color scheme for encoding the value in the set of geometric display elements, the color for a particular geometric display element being different than the colors of other geometric display elements in the same set of geometric display elements.

4. The system of claim 1, wherein the one or more offers comprise offers only from seller computer systems on an approved vendor list (AVL).

5. The system of claim 1, wherein a value encoded in a set of geometric display elements comprises a range of values within a predetermined range of values.

6. The system of claim 1, wherein the bars are columns.

7. The system of claim 1, wherein the buyer computer system is further configured to:

receive a selection of a particular pattern associated with a particular offer;

receive an instruction to generate an order based on the values for the offer associated with the selected pattern;

in response to receiving the instruction, automatically generate an order based on the values for the offer associated with the selected pattern; and communicate the generated order for matching with the selected offer.

8. The system of claim 1, wherein the buyer computer system is further configured to display the values specified in the buyer request and the values specified in the offer associated with the at least one selected pattern.

9. A method for generating an order in an electronic marketplace, comprising:

receiving, by a server, from at least one of a plurality of seller computers, one or more offers, the one or more offers reflecting values specified for a plurality of seller offer variables;

storing, by the server, the one or more offers as transactional data in one or more databases;

receiving, by a buyer computer, a buyer request, the buyer request comprising values for a plurality of buyer offer variables;

accessing, by the buyer computer, the one or more offers stored as transactional data in the one or more databases;

generating, by the buyer computer, a display comprising:

a buyer request display comprising one or more patterns representing the buyer request, the one or more patterns of the buyer request comprising a plurality of bars, each bar representing a particular buyer offer variable and comprising a set of one or more geometric display elements, the particular one of the plurality of buyer offer variables being encoded by the buyer computer system according to a predefined encoding scheme, wherein each geometric display element in the set of geometric display elements has a color according to the value being represented; and an offers display of the one or more offers, the offers display comprising a plurality of patterns, each pattern of the plurality of patterns representing a particular one of the one or more offers and comprising a plurality of bars, each bar representing a particular one of the plurality of seller offer variables and comprising a set of one or more geometric display elements, the particular one of the plurality of seller offer variables being encoded by the buyer computer system according to the predefined encoding scheme, wherein each geometric display element in the set of geometric display elements has a color according to the value being represented;

comparing, by the buyer computer, the one or more patterns of the buyer request display with the plurality of patterns of the offers display to determine a best fit match between at least one of the plurality of patterns representing the one or more offers and the one or more patterns representing the buyer request; and generating, by the buyer computer, an order based on the best fit match and communicating the order to the server.

10. The method of claim 9, wherein the predefined encoding scheme encodes a first value of a first offer variable in a first pattern associated with a first offer and encodes a second value of the first offer variable in a second pattern associated with a second offer.

11. The method of claim 9, wherein the sets of geometric display elements are encoded according to a predefined color scheme; and each geometric display element in a set of geometric display elements has a color according to the value being represented and the scheme for encoding the value in the set of geometric display elements, the color for a particular geometric display element being different than the colors of other geometric display elements in the same set of geometric display elements.

12. The method of claim 9, wherein the one or more offers comprise asks only from sellers computers on an approved vendor list (AVL).

13. The method of claim 9, wherein a value encoded in a set of geometric display elements comprises a range of values within a range of possible values.

14. The method of claim 9, wherein the bars are columns.

15. The method of claim 9, further comprising:

receiving a selection of a particular pattern associated with a particular offer;

receiving an instruction to generate an order based on the values for the offer associated with the selected pattern;

in response to the instruction, automatically generating an order based on the values for the offer associated with the selected pattern; and communicating the generated order for matching with the selected offer.

16. The method of claim 9, further comprising displaying the values specified in the buyer request and the values specified in the offer associated with the at least one selected pattern.

17. A computer readable medium that generates an order in an electronic marketplace, the computer readable medium having executable instructions which when executed cause a computer to perform the acts comprising:

receiving, by a server, from at least one of a plurality of seller computers, one or more offers, the one or more offers reflecting values specified for a plurality of seller offer variables;

storing, by the server, the one or more offers as transactional data in one or more databases;

receiving, by a buyer computer, a buyer request, the buyer request comprising values for a plurality of buyer offer variables;

accessing, by the buyer computer, the one or more offers stored as transactional data in the one or more databases;

generating, by the buyer computer, a display comprising:

a buyer request display comprising one or more patterns representing the buyer request, the one or more patterns of the buyer request comprising a plurality of bars, each bar representing a particular buyer offer variable and comprising a set of one or more geometric display elements, the particular one of the plurality of buyer offer variables being encoded by the buyer computer system according to a predefined encoding scheme, wherein each geometric display element in the set of geometric display elements has a color according to the value being represented; and an offers display of the one or more offers, the offers display comprising a plurality of patterns, each pattern of the plurality of patterns representing a particular one of the one or more offers and comprising a plurality of bars, each bar representing a particular one of the plurality of seller offer variables and comprising a set of one or more geometric display elements, the particular one of the plurality of seller offer variables being encoded by the buyer computer system according to the predefined encoding scheme, wherein each geometric display element in the set of geometric display elements has a color according to the value being represented;

comparing, by the computer, the one or more patterns of the buyer request display with the plurality of patterns of the offers display to determine a best fit match between at least one of the plurality of patterns representing the one or more offers and the one or more patterns representing the buyer request; and generating, by the computer, an order based on the best fit match and communicating the order to the server.

18. The computer readable medium of claim 17, wherein the predefined encoding scheme encodes a first value of a first offer variable in a first pattern associated with a first offer and encodes a second value of the first offer variable in a second pattern associated with a second offer.

19. The computer readable medium of claim 17, wherein the sets of geometric display elements are encoded according to a predefined color scheme; and each geometric display element in a set of geometric display elements has a color according to the value being represented and the scheme for encoding the value in the set of geometric display elements, the color for a particular geometric display element being different than the colors of other geometric display elements in the same set of geometric display elements.

20. The computer readable medium of claim 17, wherein the one or more offers comprise asks only from sellers computers on an approved vendor list (AVL).

21. The computer readable medium of claim 17, wherein a value encoded in a set of geometric display elements comprises a range of values within a range of possible values.

22. The computer readable medium of claim 17, wherein the bars are columns.

23. The computer readable medium of claim 17, wherein the executed instructions further perform the acts comprising:

receiving a selection of a particular pattern associated with a particular offer;

receiving an instruction to generate an order based on the values for the offer associated with the selected pattern;

in response to receiving the instruction, automatically generating an order based on the values for the offer associated with the selected pattern; and communicating the generated order for matching with the selected offer.

24. The computer readable medium of claim 17, wherein the executed instructions further perform the acts comprising displaying the values specified in the buyer request and the values specified in the offer associated with the at least one selected pattern.

* * * * *